Sept. 14, 1926.  
C. E. FREDERICKSON  
1,599,614  
STEERING MECHANISM FOR AUTOMOTIVE VEHICLES  
Filed Sept. 29, 1925  
3 Sheets-Sheet 1
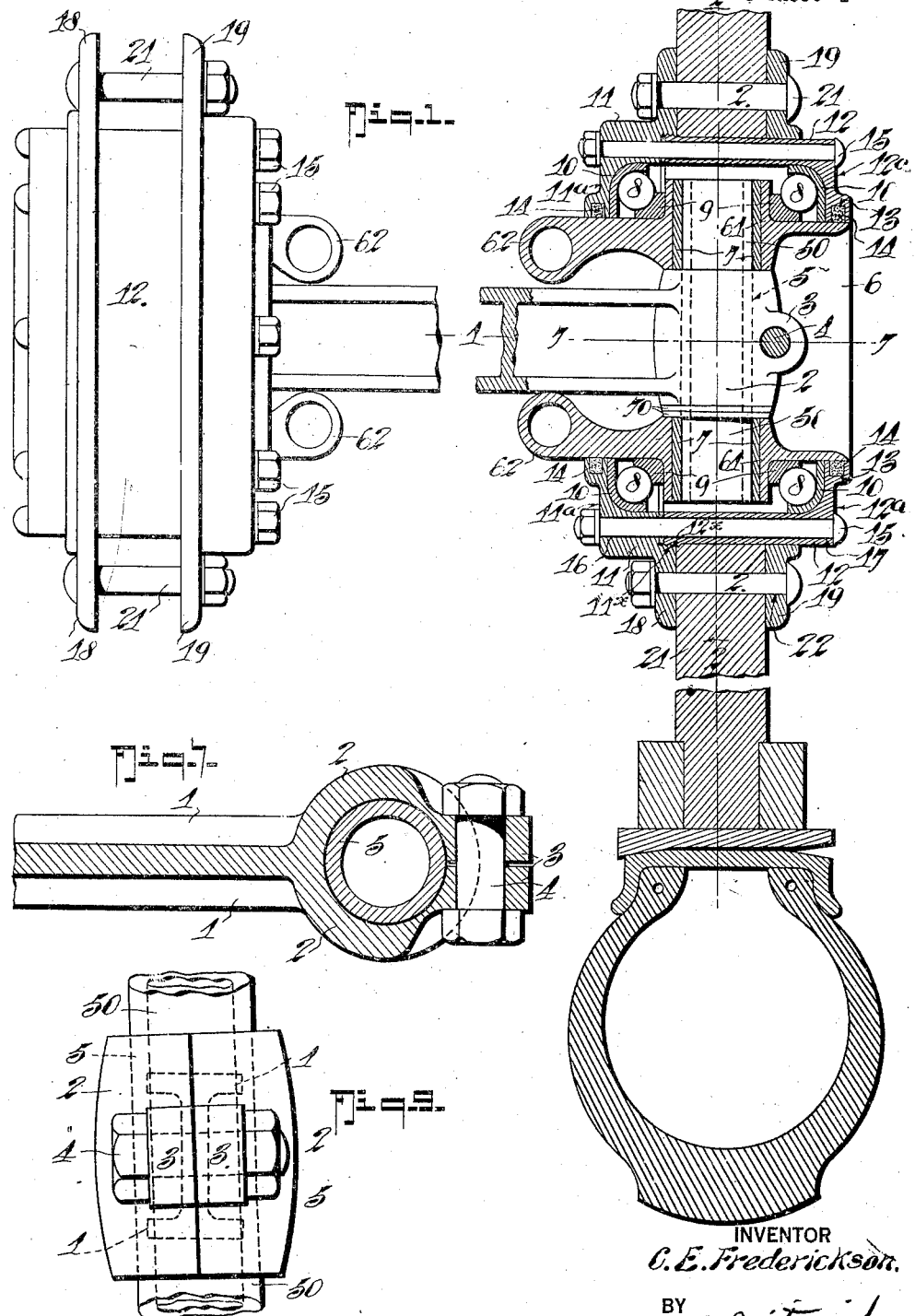
INVENTOR  
C. E. Frederickson.  
BY  
Albert E. Dietrich  
ATTORNEYS

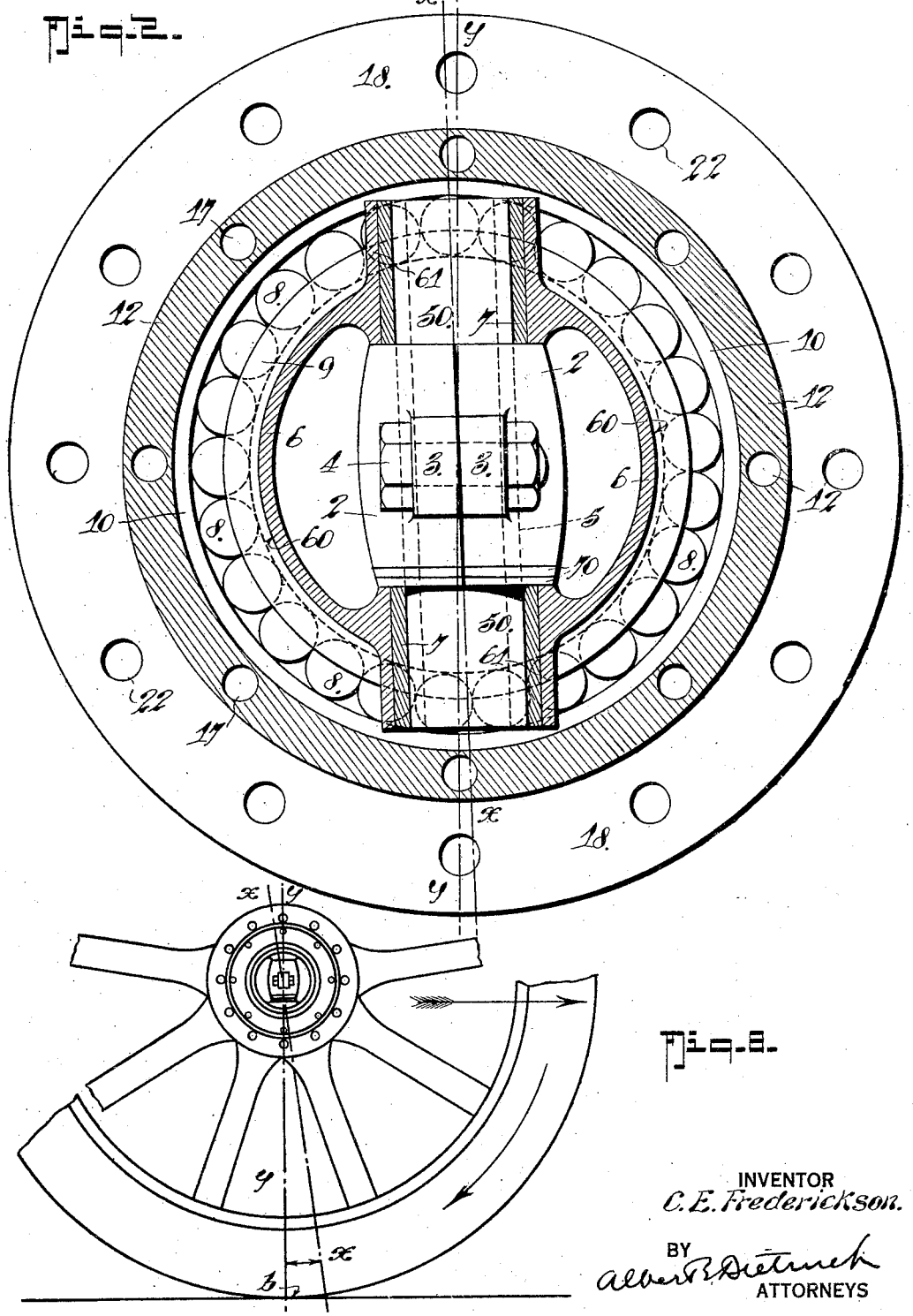

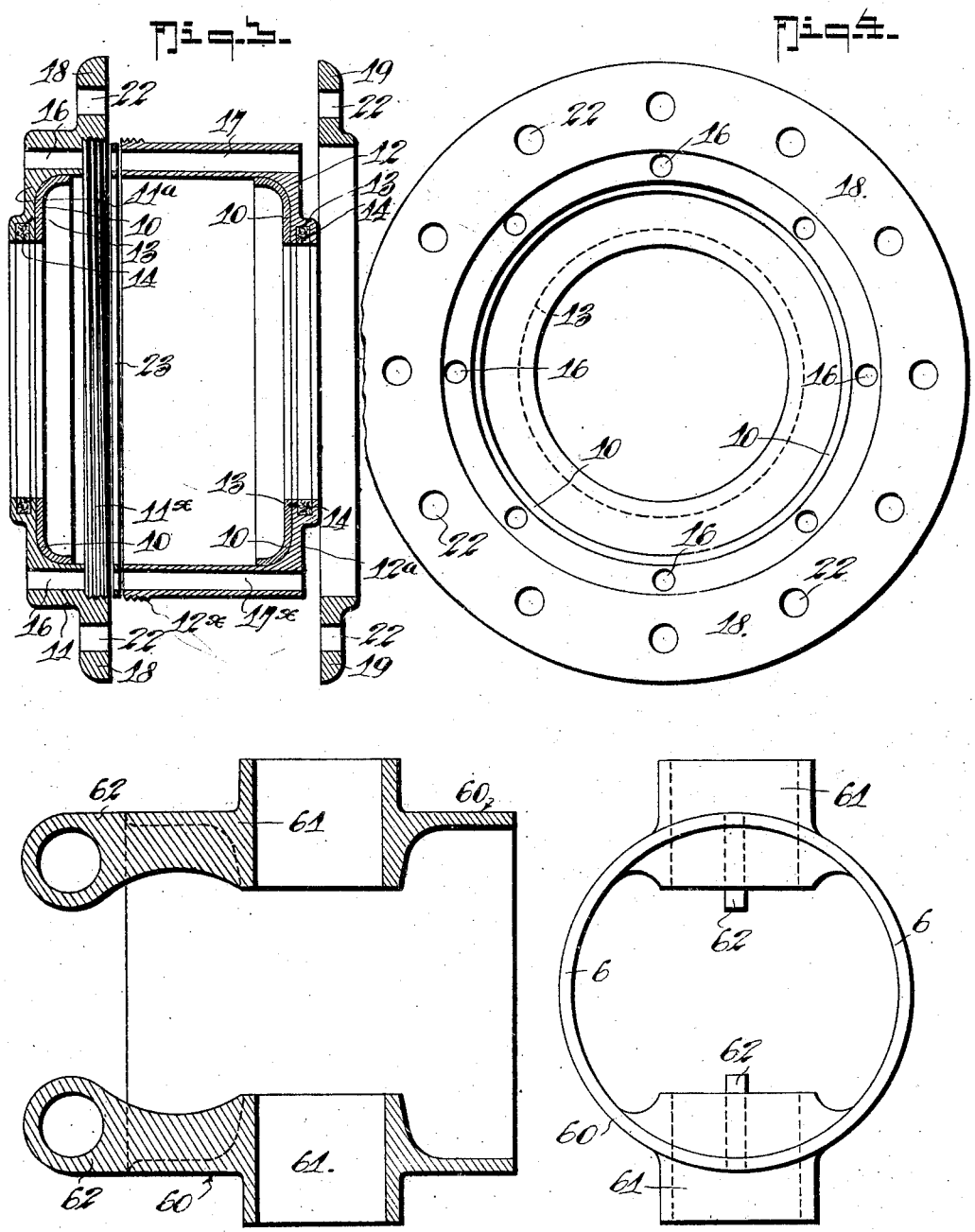

Patented Sept. 14, 1926.

1,599,614

UNITED STATES PATENT OFFICE.

CLAYTON E. FREDERICKSON, OF CHICAGO, ILLINOIS, ASSIGNOR TO NO-SPINDLE AXLE COMPANY, OF CHICAGO, ILLINOIS.

STEERING MECHANISM FOR AUTOMOTIVE VEHICLES.

Application filed September 29, 1925. Serial No. 59,342.

This invention relates generally to steering mechanisms for automotive vehicles and more particularly to the present common type of auto or truck front axle and front wheel connections, in which the front axle couplings or knuckle pins are fitted to the inside of or adjacent to the steering wheel.

In the conventional type of four wheel trailers of today is used the common type of auto or front truck axles. From experience with trailer axles of the common type I have found that the desired and proper trailing effect is not present in the use of the said common type of front axles for four wheel trailers, since each bump or raise in the road keeps the wheels swaying, causes them to drag harder and to such extent that they do not steer as easily as desired.

Furthermore, trailer axles coupled with the wheels in the present conventional way, are relatively short lived, since the connections are more or less weak and susceptible of breakage, under heavy load strains.

Primarily, my invention has for its purpose to provide an improved construction of trailer axle and steering wheel connections therefor in which the said connections are particularly designed to relieve the pivot pin and to so position the said pin that the pivotal effect is in the center of the wheel and is so arranged as to give the wheel a caster effect.

Another object of my invention is to provide an improved connection for coupling the steering wheel to axles of the general character mentioned, that is simple, strong and durable, one that overcomes the objection noted and incident in the use of the common type of auto or truck front axles, and in which the cooperating parts are so designed and combined that the danger of breakage of the steering gear is reduced to the minimum when under the severest load strain to which the same may be subjected.

My invention also comprehends certain parts and features, relating to other objects and purposes than those stated, which will become apparent as the following detailed description is considered and my said invention therefor consists of an improved caster type of trailer axle with steering wheel connections that embodies the peculiar features of construction and novel arrangement of parts which are fully explained in the following detailed description, specifically mentioned in the appended claims and illustrated in the accompanying drawings, which disclose a preferred and practical embodiment of my invention, it being understood that the details of construction illustrated and described are susceptible of such modifications and variations under the scope of the appended claims as may develop in the practical application of my invention to different designs or makes of axles and steering wheels.

In the drawings:

Figure 1 illustrates a trailer axle equipped with my improved steering wheel connections, one of the said connections being shown in side elevation and the other in vertical section, a portion of the wheel and tire structure being also indicated in this figure.

Figure 2 is a transverse section of the axle, the wheel portions and the pivot pin connections taken substantially on the line 2—2 of Figure 1.

Figure 3 is a cross section of a two-part hub, a supplemental or clamping hub flange being shown as supported from its adjacent main hub section, the ball races that fit inside the hub sections being also shown.

Figure 4 is a face view of one side of the hub with one of the ball races showing.

Figure 5 is an enlarged cross section of the malleable cast cylindrical bearing or steering hub that is hereinafter specifically mentioned.

Figure 6 is an end elevation of the part shown in Figure 5.

Figure 7 is a detail horizontal section of the split or axle bed end, taken on the line 7—7 of Figure 1.

Figure 8 is an end elevation of a portion of one of the steering wheels and diagrammatically illustrates the inclination feature of the pivotal bearing hereinafter specifically described.

Figure 9 is a detail view of one end of the axle and a part of the tubular pivot pin clamped thereon, the inclined relation of the axle end, relatively to the body portion of the axle, being indicated in this view.

The axle 1, which is of the usual cross sectional shape, has its opposite ends terminating in split or bed portions 2—2, one of which is shown in detail in Figures 7 and 9, by reference to which it will be noticed the said split or bed end of the axle has a pair of apertured ears 3 that are adapted for receiving a clamp bolt 4 for tightly clamping a tubular bearing pin 5 to hold said pin to its proper operative position, and the said split end of the axle is inclined, with respect to the main or body portion thereof, as is best shown in Figure 9, the reason for which will presently appear.

Cooperative with the journals 50—50 of the pivot pin 5, and which projects upwardly and downwardly from the axle, is what is hereinafter termed a steering hub and the said hub is in the nature of a malleable cast cylindrical casing 6 whose outer peripheral surface 60 constitutes the inner bearing for the wheel hub structure, presently explained. The hub 6 is provided with a pair of diametrically opposite tubular bearings 61—61 each of which is lined with a hardened steel bushing 7, as shown.

The oppositely disposed bearings 61 journal on their respective upper and lower ends 50—50 of the tubular pivot pin 5, as is clearly shown in Figures 1 and 2, which indicate the aperture in the axle and so directed that the pin 5, together with the said axle end inclines backwardly (see line $x$) at the upper end, with respect to the vertical or central bearing line $y$ of the wheel, as is diagrammatically illustrated in Figure 8, the purpose of which will presently appear, it being understood that the upper or inner face of the lower tubular bearing 61 constitutes the thrust seat for the adjacent axle end, spacer or wear disks 70 being interposed between the said seat 60 and the axle bed, as shown.

The steering hub or casing 6 has apertured arms or extensions 62 for connecting with the customary steering and equalizing rods or devices controlled from the steering wheel of the automotive vehicle and in any approved and well known manner, it being apparent, that as the hub casing 6, upon which the wheel is mounted, is turned laterally, that is,—in the horizontal plane on the journal 50—50, the said wheel is freely shifted by steering wheel manipulation to take road directions, as desired.

Referring now more particularly to Figures 1 and 2 of the drawing, it will be noticed the wheel hub is mounted to revolve about its axle end and the cooperative steering hub and to facilitate the turning of the wheel, the said wheel hub rides upon a double set of annularly disposed ball bearings 8—8 that revolve as rollers between and around a pair of parallel rings which, in my construction, consists of the inner ball bearing or race rings 9—9 that are slipped onto and tightly engage the peripheral face of the steering hub 6, and the ball races or cup shaped rings 10—10 that seat within the main wheel hub, as is best shown in Figures 1 and 2.

The wheel hub structure, in my construction of steering wheel, and which is illustrated in detail in Figures 3 and 4, consists of two half sections 11—12, each formed with an inwardly extended annular rim $11^a$—$12^a$, which rims bear on the steering hubs 6 when the parts are assembled for use, and each of which has an annular groove 13 in its bearing face for the reception of a felt washer 14, the latter providing a tight closure to keep dust from entering and settling along the ball bearing surfaces and the opposite surfaces of the steering wheel and the hub portions.

The two half wheel hub sections 11—12 are secured flatwise against one another, by a series of screw bolts 15 and the said bolts take through annular rows of apertures 16—17 in the two opposing hub sections, and the hub section 11, before mentioned, is also provided with a flange 18 between which and a supplemental hub flange 18 that slips onto the hub section 12, the hub ends of the wheel spokes are held secured by clamp bolts 21 which pass through registering concentric apertures 22 in the flanges 18—19, as shown.

To provide further for a tight closure of the hub parts and for maintaining a lubricant within the annular space 22 between the steering and wheel hub portions, one or more rings 23 may be interposed between the abutting edges of the two hub sections, the abutting line of the said sections being preferably located at a point beyond the spoke engaging surface of the hub section 12. Also the hub sections 11 and 12 may have a threaded connection $11^x$—$12^x$ for taking up slack, etc.

By inclining the pivot pin in the manner stated, that is, inclined relatively to the line $y$ that passes vertically through the center of the wheel, as diagrammatically indicated in Figure 8 the wheels have the same effect, as they are drawn along, as is present in the use of the ordinary furniture casters.

My improved construction of axle and steering wheel connections herewith can be used with any self-controlled vehicle truck and by forming the main hub sections with internal end or bearing rims, as stated, and which are provided with an annular groove in its bearing face, in which is held a packing ring, as before mentioned, when the wheel parts are assembled upon the steering hub and the axle body by packing cup grease within the bearing balls' raceway or spaces between the steering hub and the wheel hub the pivot pin will always remain oiled and the wheel and the pivot pins are thus taken care of for the season.

From the foregoing taken in connection with the drawings, the complete construction, the manner in which the several parts cooperate and the advantages of my construction of connections for joining the steering wheel of an automotive vehicle with the trailer or front axle will be readily apparent to those familiar with the use of and the making of trailer axles as wheel connections therefor of the type to which my said invention particularly relates.

What I claim is:

1. In a steering wheel, the combination with the axle having a split clamp at one end, a bearing pin secured in said clamp, a steering hub having bearings journalled on said pin and including an annular flange at each side of said pin, the axis of which coincides with the axis of rotation of the wheel, said flanges being of the same diameter, a wheel having a hub apertured to fit on said annular flanges and chambered to provide bearing and lubricant spaces, combined annular and end thrusts bearings between said wheel hub and said annular flanges of the bearings hub within said chamber, the ends of said pin terminating in said chamber, packing rings carried by said wheel hub and engaging said annular flanges to retain lubricant within said chamber and thereby lubricate the bearings, said wheel hub comprising opposite sections, a packing ring between said sections, bolts clamping said sections and packing ring together, one of said sections having a flange and a supplemental flange cooperating with said last named flange and bolts to clamp the wheel spokes between said flanges, substantially as shown and described.

2. In a steering wheel, the combination with the axle, a bearing pin carried by said axle, a cylindrical steering hub having two external bearing surfaces and intermediate thereof having bearings for receiving said bearing pin, the axis of said bearings lying normal to the axis of said bearing surfaces, said steering hub having provisions by which the steering gear may be attached thereto, a wheel hub comprising two cuplike members adapted to fit together end to end and apertured to fit on said bearing surfaces of said steering hub, said wheel hub members where they are apertured being provided with packing grooves and packing rings whereby to enclose a grease tight chamber, combined end thrusts and annular anti-friction bearings including balls and ball races fitted onto said bearing surfaces of said steering hub and within said wheel hub members, bolts connecting said wheel hub members together and thereby retaining said wheel hub in place on said steering hub and retaining said anti-friction bearing members in place, one of said wheel hub members having a fixed flange, a supplemental flange on the other wheel hub member and bolts passing through said flanges to secure said wheel hub members to the spokes of the wheel.

3. In a steering wheel, the combination with the axle having a split clamp at one end, a bearing pin secured in said clamp, a steering hub having bearings journalled on said pin and including an annular flange at each side of said pin, the axis of which coincides with the axis of rotation of the wheel, said flanges being of the same diameter, a wheel having a hub apertured to fit on said annular flanges and chambered to provide bearing and lubricant spaces, combined annular and end thrusts bearings between said wheel hub and said annular flanges of the bearings hub within said chamber, the ends of said pin terminating in said chamber, packing rings carried by said wheel hub and engaging said annular flanges to retain lubricant within said chamber and thereby lubricate the bearings, said wheel hub comprising opposite sections, a packing ring between said sections, bolts clamping said sections and packing ring together, one of said sections having a flange and a supplemental flange cooperating with said last named flange and bolts to clamp the wheel spokes between said flanges, said hub members being threaded together substantially as shown and described.

4. In a steering wheel, the combination with the axle having a split clamp at one end, a bearing pin secured in said clamp, a steering hub having bearings journalled on said pin and including an annular flange at each side of said pin, the axis of which coincides with the axis of rotation of the wheel, a wheel having a hub apertured to fit on said annular flanges and chambered to provide bearing and lubricant spaces, anti-friction bearings between said wheel hub and said annular flanges of the bearing hub within said chamber, the ends of said pin terminating in said chamber, packing rings carried by said wheel hub and engaging said annular flanges to retain lubricant within said chamber and thereby lubricate the bearings, said wheel hub including two sections having threaded connection with one another and having opposing apertures, securing bolts with nuts held in said apertures.

CLAYTON E. FREDERICKSON.